(12) United States Patent
Benke et al.

(10) Patent No.: US 9,819,724 B2
(45) Date of Patent: *Nov. 14, 2017

(54) XML COMMUNICATION

(71) Applicant: International Business Machines Corporation, Armonk, NY (US)

(72) Inventors: Oliver Benke, Boeblingen (DE); Stefan Letz, Markranstaedt (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,791

(22) Filed: Jan. 24, 2017

(65) Prior Publication Data

US 2017/0134473 A1 May 11, 2017

Related U.S. Application Data

(63) Continuation of application No. 14/501,648, filed on Sep. 30, 2014, now Pat. No. 9,584,616.

(30) Foreign Application Priority Data

Oct. 9, 2013 (GB) .................................. 1317820.7

(51) Int. Cl.
*G06F 15/16* (2006.01)
*H04L 29/08* (2006.01)
(Continued)

(52) U.S. Cl.
CPC ............ *H04L 67/02* (2013.01); *G06F 17/272* (2013.01); *G06F 17/3092* (2013.01); *H04L 67/42* (2013.01)

(58) Field of Classification Search
CPC ... G06F 17/272; G06F 17/2247; H04L 29/06; H04L 29/08
(Continued)

(56) References Cited

U.S. PATENT DOCUMENTS

| 7,441,185 B2 | 10/2008 | Coulson et al. |
| 8,136,109 B1 | 3/2012 | Birdeau et al. |

(Continued)

FOREIGN PATENT DOCUMENTS

| EP | 1677488 A1 | 5/2006 | |
| EP | 1677488 A1 * | 7/2006 | ............. H01L 67/42 |

OTHER PUBLICATIONS

Search Report under Section 17(5) for GB1317820.7 dated Mar. 4, 2014, 4 pages.

(Continued)

*Primary Examiner* — Tauqir Hussain
(74) *Attorney, Agent, or Firm* — Heslin Rothenberg Farley & Mesiti P.C.

(57) ABSTRACT

A distributed system includes a client and a server. The client may comprise a serialization module for serializing data into a first communication format to communicate the data to a server. The server may include a communication format parser for de-serializing the data received into a server-internal communication format. The serialization module may also be adapted for transforming the data into the server-internal communication format for a communication to the server. The client may also be adapted for indicating to the server that the client is capable of sending data in the server-internal communication format, and the server may be able to indicate its readiness to receive such data. The data may be sent either in the first or, alternatively, in the server-internal format.

20 Claims, 6 Drawing Sheets (51) Int. Cl.
*H04L 29/06* (2006.01)
*G06F 17/30* (2006.01)
*G06F 17/27* (2006.01)

(58) Field of Classification Search
USPC .......................................................... 709/203
See application file for complete search history.

(56) References Cited

U.S. PATENT DOCUMENTS

| 8,190,775 | B2* | 5/2012 | Haller | G06F 17/30914 |
| | | | | 709/219 |
| 2003/0233484 | A1 | 12/2003 | Takamura | |
| 2005/0273772 | A1* | 12/2005 | Matsakis | G06F 8/41 |
| | | | | 717/136 |
| 2006/0168513 | A1 | 7/2006 | Coulson et al. | |
| 2008/0104095 | A1* | 5/2008 | Heifets | G06F 17/272 |
| 2008/0168423 | A1* | 7/2008 | Daskal | G06Q 10/10 |
| | | | | 717/120 |

OTHER PUBLICATIONS

Benke et al. Notice of Allowance, U.S. Appl. No. 14/501,648, filed Sep. 30, 2014, 7 pages.

Jaimez-González, Carlos R. et al., "Interoperability of Java and C# with Web Objects in XML." In: Proceedings of the IADIS International Conference on e-Society. International Association for the Development of the Information Society (IADIS), pp. 518-522. ISBN 9789728939465, 2011 (no further date information available).

* cited by examiner

XML COMMUNICATION

This application claims priority from United Kingdom patent application number 1317820.7, filed Oct. 9, 2013, which is hereby incorporated herein by reference in its entirety.

BACKGROUND

One or more aspects of the invention relate generally to a distributed system to improve XML communication. Further, one or more aspects of the invention relate to a method for performing a communication in a distributed system to improve XML communication, a data processing program, and a computer program product.

Modem communication protocols between computer systems, e.g., a server and a client, often rely on XML (eXtensible Markup Language) as the standard vehicle to code data to be transmitted from one system to another. Thereby, a client application, running on a client computer, serializes a given client application data model into XML. Typically, a standard API (Application Programming Interface) providing a de-serialization function may be used on the client-side to perform such a data transformation.

The serialized XML data may then be sent over a network to a server application running on the server. This server environment receives the serialized XML data and writes it to an input buffer. Here, the XML data may be parsed and de-serialized into an output buffer format. Further processing by the server application may be performed using the data in the output buffer format.

However, the de-serialization of the data received from the client and the required transformation into the output buffer format for further processing on the server-side requires server computing resources.

A couple of documents focus on XML, data communication.

U.S. Pat. No. 7,441,185 B2, incorporated by reference herein in its entirety, discloses a method for processing XML documents in a computer-based system. The method includes associating each of a plurality of information items with a corresponding one of a plurality of binary-data units and providing an XML document associated with an XML information set comprising one or more of the plurality of information items. The method includes also serializing the XML document into a binary XML format, or de-serializing the XML document from the binary XML format.

U.S. Pat. No. 8,136,109 B1, incorporated by reference herein in its entirety, describes a method for delivering data and formatting information including delivering object definition files from a server to a client. The method comprises generating definitions and object instantiations at the client using JavaScript or another simple browser-interpreted language for objects relating to data modeling and presentation.

However, known functions callable through XML APIs generate XML formatted data for the communication from the client to the server which in turn may require a compute-intensive de-serialization and transformation into a server-side processing data format.

SUMMARY

According to one aspect, a distributed system is provided. The system includes, for instance, a client comprising a serialization module to serialize data into a first communication format, wherein the client is configured to communicate the data in the first communication format to a server, the serialization module being further adapted to transform the data into a server-internal communication format, and the client being configured to communicate the data in the server-internal communication format to the server; the client being adapted to indicate to the server that the client is capable of sending data in the server-internal communication format; and the client being adapted, responsive to an indication of readiness of the server to receive the data in the server-internal communication format, to send the data in the server-internal communication format, and otherwise being adapted to send the data in the first communication format

BRIEF DESCRIPTION OF THE SEVERAL VIEWS OF THE DRAWINGS

Embodiments of the invention will now be described, by way of example only, and with reference to the following drawings.

DETAILED DESCRIPTION

The serialization and, optionally the de-serialization, may be based on CORBA techniques (Common Object Request Broker Architecture) for client/server communication.

The mentioned data may be data of the client application. However, the data may also be other data that may be transferred via the client application.

A skilled person will understand that an application program may use the serialization module or function by calling a function using a related API.

In the context of this description, the following conventions, terms and/or expressions may be used:

The term "distributed system" may denote a hardware-based software system in which components, located on networked computers, communicate and coordinate their actions by passing messages or information.

The term "client" may denote a client computing system and/or a software system in the sense of client/server computing. It may be any processing system capable of executing program code. Any other computer or processing system may be seen as server. Typically, a client may access a service provided by a server.

The term "application programming interface" (API) may denote a specification of how software components may interact with each other. Behind an API there may be a functional module, typically realized in software, or alternatively, in parts in hardware. Typically, an API may be used to call a subroutine or function to perform a specific task, e.g., a serializing or de-serializing of data.

The term "serializing" may denote a process of translating data structures or object states into a format that may be stored (e.g., in a file or an input or output buffer, or transmitted across a network connection link) and resurrected later in the same, or another, computer environment. When the resulting series of bits may be re-read according to the serialization format, it may be used to create a semantically identical clone of the original object. This process may be denoted by the term "de-serialization".

The term "first communication format" may denote a format in which data may be communicated from, e.g., the client to another computer system, e.g., a server. The first communication format may be a standardized format, like, e.g., the XML format.

The term "communication format parser" may denote a subsystem, module, or subroutine adapted for receiving an input stream of data in a specific format, e.g., the first communication format, e.g., the XML, format, and transforms the incoming data into another format, e.g., the server-internal format, like, e.g., an XML output buffer format which may be a self-describing data format.

The term "server-internal communication format" may denote a special data format that may be handled especially easy in a server-specific application or may be designed to improve further processing with the server environment. It may, e.g., be the XML output buffer format of a z/OS System Service.

The term "mainframe computer" may denote a computer mainly used by larger entities for bulk computing jobs or a larger number of interactive users. The term referred originally to the physically large cabinets housing the central processing unit. Today, it may be used for high-end computers such as those used in enterprise environments.

Aspects of the distributed system to improve XML communication and the related method may allow a reduction in communication overhead between a client and a server. Thus, in particular, the resources of the server may be used in a more efficient way. Resources may be saved and scalability increased. Typically, the communication may be based on a client-side application programming interface, e.g., an XML API. Besides such a communication technique, the client and server may use an alternative communication format which is more suitable for a specific server. If, e.g., the server may be a computer system running a mainframe operating system, like z/OS, the client may be enabled to generate an alternative data format for a transfer of data from the client to the server. This may allow that on the server the data may be written directly to a communication output buffer from which the data may be fetched for further processing without any data transformation. Thus, reduced computing resources may be required on the server-side when receiving the data from the client.

An option to use a standard XML API for generating the alternative data format may be provided. Thus, no changes may be required in the application programming code. The method may be transparent to the application. Even if the received data in the server-internal communication format may be used as input for a communication format parser, e.g., server-side XML, parser, the data may be passed unchanged to a communication output buffer for further processing in a server application. Thus, again no computing resources may be required to have the received data available in a suitable form for a further processing on the server. As described, there may be two communication formats for transferring data from the client to the server: a) a standard XML-based format and, b) alternatively the server-internal communication format.

According to one embodiment of the distributed system, the server ability for receiving the data in the server-internal communication format may comprise by-passing the communication format parser. Thus, the received data from the client may be inspected and forwarded directly to the communication output buffer because no transformation and/or de-serialization may be required.

According to an alternative embodiment of the distributed system, the server ability for receiving the data in the server-internal communication format may comprise passing the data through the communication format parser. Hence, the communication format parser may be operated in two modes: de-serialization mode and pass-through mode. This may save computing resources on the server. Resources may be used in a more optimal way.

According to one additional embodiment of the distributed system, the first communication format may be based on the eXtensible Markup Language (XML). This may be the standard way of communication between any client and any server. It may allow the client running any operating system to communicate its message to any server running any operating system. However, if the server may, e.g., be a mainframe computer running, e.g., a mainframe operating system like, e.g. z/OS or any other server operating system, the communication between the client and the server may also in this case be improved.

According to one additional embodiment of the distributed system, the indication of the readiness of the server for receiving data in the server-internal communication format may comprise sending server-internal communication format setting data to the client. This way, the client and server may be enabled to agree on the communication format to be used. Also different server-internal formats may be handled on the client side. Thus, there may be an improved communication method for each server of a plurality of different servers.

Consequently, according to one embodiment of the distributed system, the application programming interface of the client may be adapted for performing a transformation of the data into the server-internal communication format based on the server-internal communication format setting data. Hence, the communication may also be made communication format version agnostic.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

Embodiments of the invention are described with reference to different subject-matters. In particular, some embodiments are described with reference to method type claims whereas other embodiments are described with reference to apparatus type claims. However, a person skilled in the art will gather from the above and the following description that in addition to any combination of features belonging to one type of subject-matter, also any combination between features relating to different subject-matters, for example, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the distributed system to improve XML, communication, in accordance with one or more aspects of the invention, is given. Afterwards, further embodiments of the distributed system and the method for performing a communication in a distributed system will be described.

Figure 1:
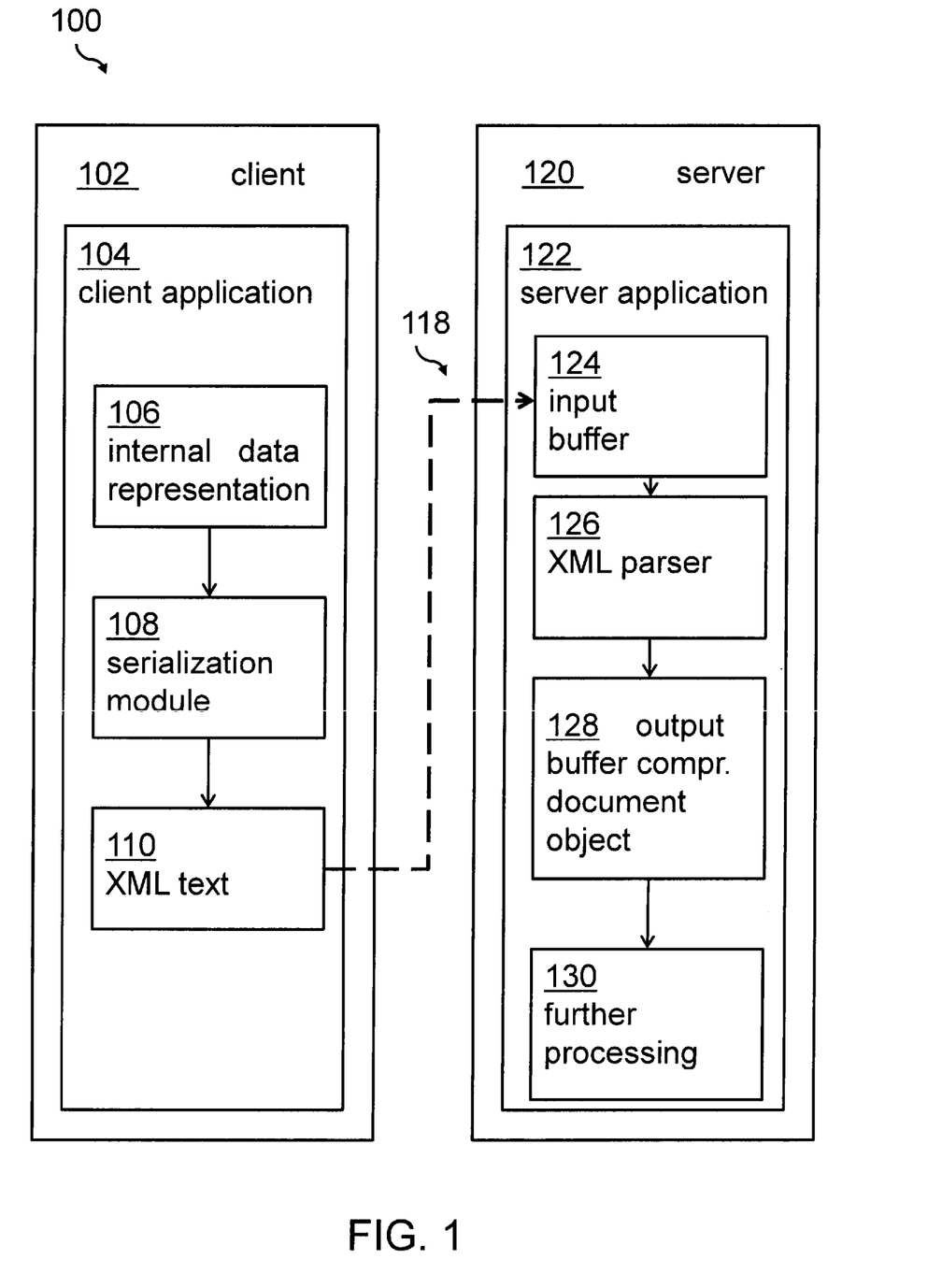
FIG. 1 shows a block diagram of a client and a server using current communication technology.

FIG. 1 shows a block diagram of a distributed system 100 comprising a client 102 and a server 120 using current communication technology between them, 118. A client application 104 may have an internal data representation 106. One example for data a, b, c may be illustrated in table 1 as an integer, a floating point value, and a string:

```
class A {
    int a = 2;
    double b = 3.14;
    string c = "EBCDIC";
}
```

Calling a serialization module 108 using an XML API the internal data presentation to be transferred to the server 120 may be serialized. The result of the serialization may be an XML, text 110 in a related output buffer of the client 102 or the client application 104, respectively, like e.g., in table 2:

TABLE 2

<xml><classA><myIntA>2</myIntA>
<myDoubleB>3.14</myDoubleB>
<myStringC>EBCDIC</myStringC>
</classA></xml>

This XML text 110 may be transferred, 118 via a network (not shown) to a server application 122 running on the server 120. On the server-side, the XML text 110 may be stored in an input buffer 124. Calling an XML API from the server application 122, an XML parsing by a communication format parser 126 may be performed. The data may then be passed to an output buffer 128 in a predefined server-internal communication format or XML output buffer format, which may also be the server-internal communication format. It may comprise the document object containing the binary XML values of the integer, the floating point value, and the string, as used as examples above. In case of a z/OS server or other servers, this XML output buffer may comprise data formatted as a well defined set of self-describing data which may be used for further processing, 130, as part of the server application 122 running on the server 120.

However, for a skilled person it may be clear that the storing in the input buffer 124 and the subsequent XML parsing using the communication format parser 126 may require computing resources of the server 120. Using one or more aspects of the invention, this may be improved as illustrated in FIG. 2.

Figure 2:
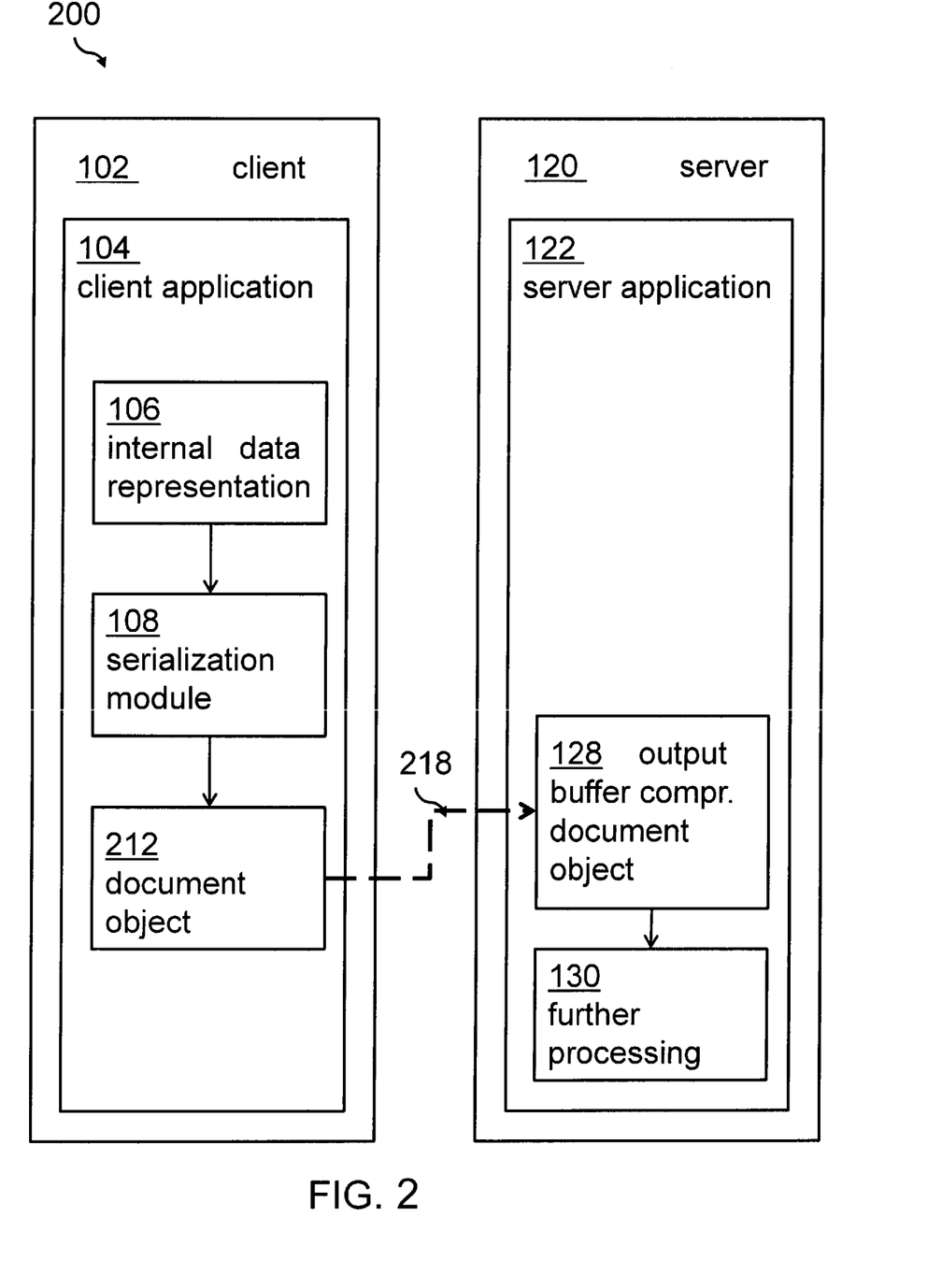
FIG. 2 shows a block diagram of a system comprising a client and a server with the communication concept, in accordance with one or more aspects of the invention.

FIG. 2 shows a block diagram 200 of a distributed system comprising the client 102 and a server 120 illustrating the communication concept of one or more aspects of the invention. In contrast to the concept described in the context of FIG. 1, the object generation by the serialization module 108 does not generate the XML, text 110 in the related output buffer, but the document object 212 for the XML output buffer 128 containing binary XML values which may be formatted in the server-internal communication format for further processing 130. This way, the input buffer 124 and the communication format parser 126 may be bypassed. This may also be expressed via the communication arrow 218 from the client 102 to the server 120 and/or the server application 122, respectively. Hence, a usage of computing resources of the server 120 may be saved and improved because no or nearly no processing may be required in the communication format parser 126 because it may be bypassed.

Figure 3:
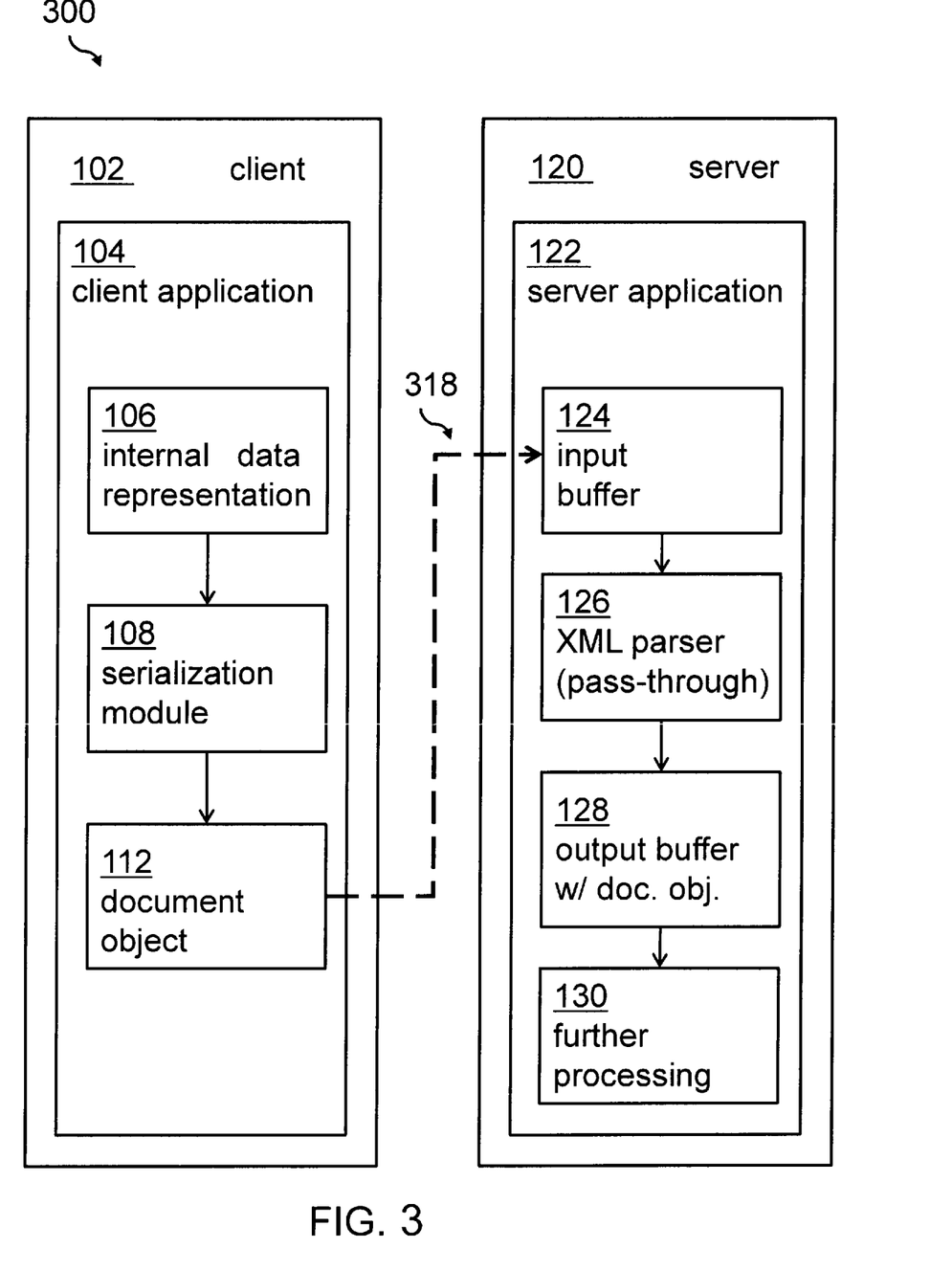
FIG. 3 shows a block diagram of a system comprising a client and a server with an alternative implementation of the communication concept, in accordance with one or more aspects of the invention.

A further mode of operation may be described using FIG. 3 which shows a block diagram 300 of the distributed system comprising the client 102 and a server 120 with an alternative implementation of the communication concept of one or more aspects of the invention. Here, the document object in the output buffer 112 which has been generated in the client application 104 is transferred, 318, to the input buffer 124 as the document object formatted in the server-internal communication format. The XML parsing of a communication format parser 126 may then be used in a path-through mode. This may require very limited to no computing resources of the server 120. This way the data in the form of the document object reaches the XML output buffer from the client 102 directly. The document object in the XML output buffer 128 may then be used for further processing 130 by the server application 122. Again, the document object may be in the format of the server-internal communication format. One advantage of the approach according to FIG. 3 is the following: (a) The standard way of handling data exchange from a client 102 to a server 120 is based on XML. (b) In case the client 102 is ready to transform the data into the server internal format, and the server 120 is ready to receive the data in that format, the communication may be improved. However, the client 102 may exchange data with any server 120 without changing anything in the application programming code. Only the XML, generation unit may require an adaptation.

Figure 4:
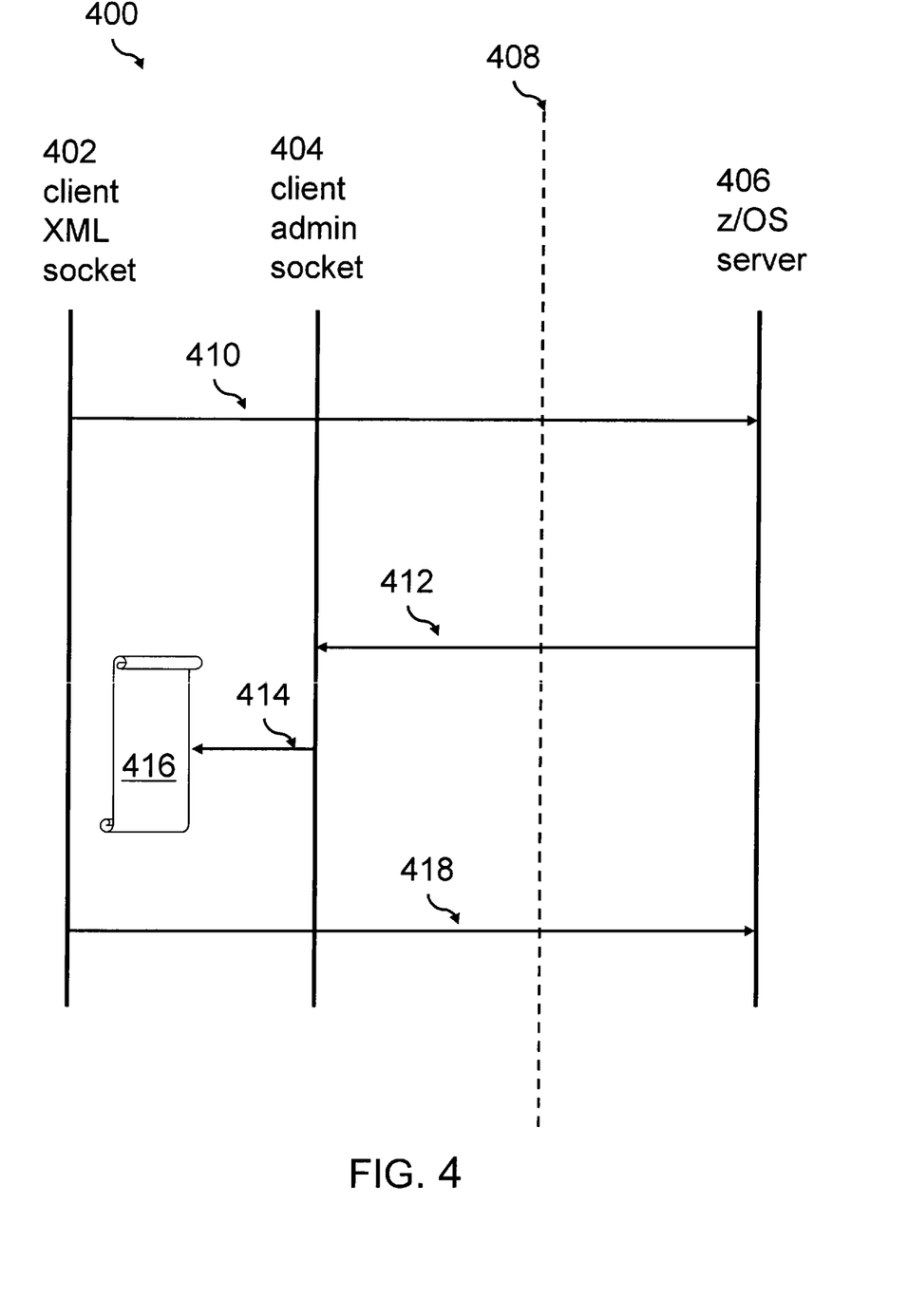
FIG. 4 shows one example of a flow diagram of a method describing a negotiation process between a client and a server for using directly the server-internal communication format.

FIG. 4 shows a flow diagram 400 of a method describing a negotiation process between the client 102 and the server 120 for using directly the XML buffer output format. 402 may represent a client XML socket, 404 may represent a client admin socket, and 406 may represent the server 120. For illustration purposes, as server a z/OS server is chosen. The dashed line 408 may represent a border between the client 102 and the server 120. At first, text XML data with an embedded request as comment in the XML data may be sent 410 from client XML socket 402 to the z/OS server 406. The embedded request may, e.g., be a comment in the following form:

<!--z/OS output buffer format V0.01, port 1903-->

This may be interpreted on the server side as a request not to use the standard XML-based communication but a faster, direct communication using the XML output buffer or the server-internal communication format. The z/OS server 406 may send a message 412 back to the client admin socket 404 to inform the client on a port, e.g., port 1903, that the server 120 is ready to understand the XML output buffer format, i.e. the server-internal communication format. In addition, the z/OS server 406 setting parameters may also be sent to the client admin socket 404. This could, e.g., be EBCDIC encoding. The setting parameters may be used, 414, to update an output buffer format setting file 416. As a next step, the client XML socket 402 may send 418 the XML text (110) data in the server-internal communication format, here the z/OS XML output buffer format, until the z/OS server 406 disables this communication improvement again by sending a termination packet to the client admin socket 404. A system administrator might enforce that the communication improvement may not be used for certain services. Turning the communication improvement off may be executed if the server application is bypassing the XML API and does string parsing of the transferred XML, instead.

It may be understood, that the z/OS XML output buffer format may be used as an example of any other specific server-internal format and that instead of a z/OS server 406 any other server may be used. This comment may also apply to the XML comment string, mentioned above, for initiating the communication in the server-internal communication format. Any other XML text string or any other port information suitable to convey the relevant message from the client 102 to the server 120 may be used.

Figure 5:
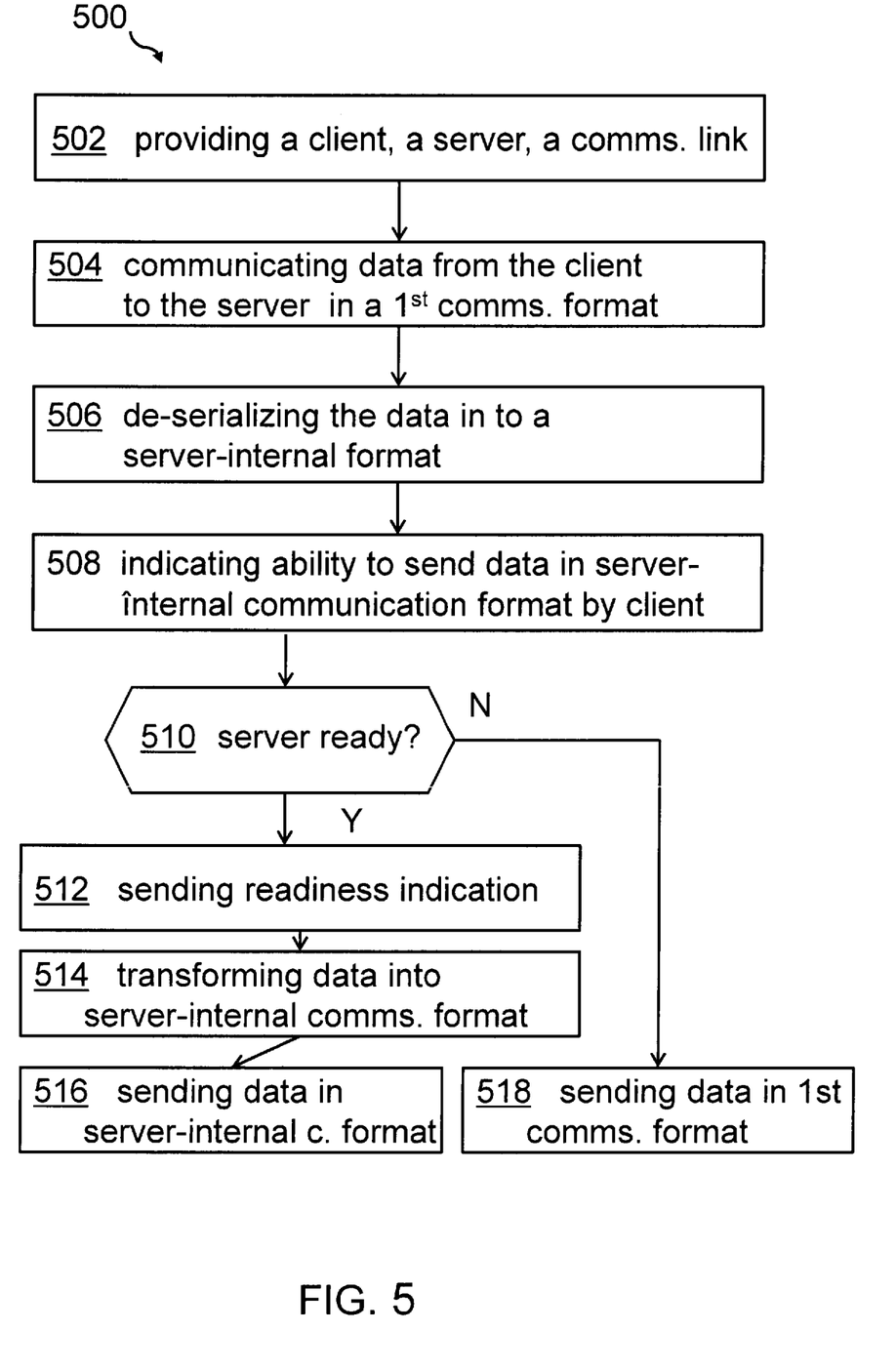
FIG. 5 shows one example of a flow diagram of the method of communication in a distributed system for improving XML, communication.

FIG. 5 shows one example of a flow diagram of a method 500 of communication in a distributed system for improving XML communication. A communication link is provided 502 between a client and a server. Data is communicated 504 from the client to the server in a first communications format. The data is deserialized 506 into a server-internal format. The client indicates 508 an ability to send data in a server-internal communication format.

A determination is made as to whether the server is ready 510. If the server is ready, the server sends 512 a readiness indication to receive the data in the server-internal format. In response to receiving the readiness indication from the server, the client transforms 514 the data into a server-internal communications format, and communicates 516 the data to the server in the server-internal communications format.

Returning to 510, if the server is not ready, the client may send 518 the data in the first communications format to the server.

Figure 6:
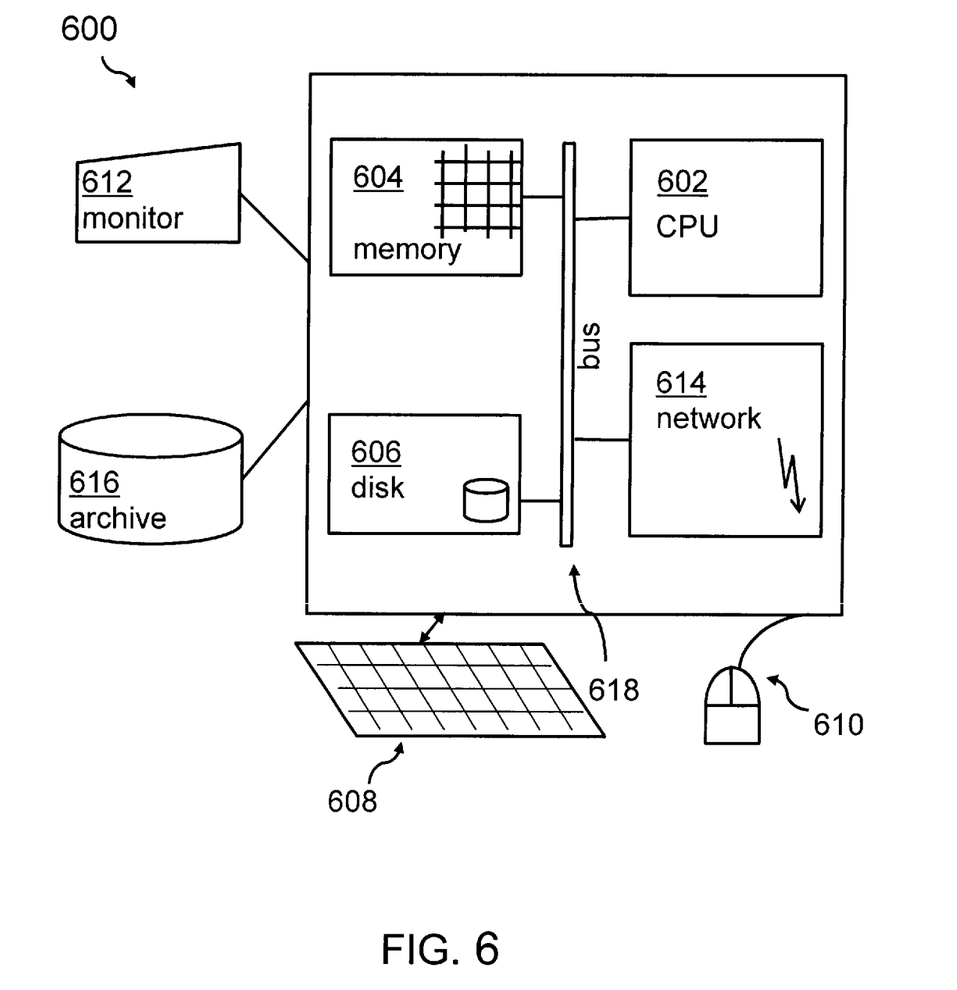
FIG. 6 shows one example of a block diagram of a client and/or server computer.

Generally, embodiments of the invention may be implemented together with virtually any type of computer as client or server, regardless of the platform being suitable for storing and/or executing program code. For example, as shown in FIG. 6, a computing system 600 may include one or more processor(s) 602 with one or more cores per processor, associated memory elements 604, an internal storage device 606 (e.g., a hard disk, an optical drive such as a compact disk drive or digital video disk (DVD) drive, a flash memory stick, a solid-state disk, etc.), and numerous other elements and functionalities, typical of today's computers (not shown). The memory elements 604 may include a main memory, e.g., a random access memory (RANI), employed during actual execution of the program code, and a cache memory, which may provide temporary storage of at least some program code and/or data, in order to reduce the number of times code and/or data must be retrieved from a long-term storage medium or external bulk storage 616 for an execution. Elements inside the computer 600 may be linked together by means of a bus system 618 with corresponding adapters.

The computing system 600 may also include input means, such as a keyboard 608, a pointing device such as a mouse 610, or a microphone (not shown). Alternatively, the computing system may be equipped with a touch sensitive screen as a main input device. Furthermore, the computer 600, may include output means, such as a monitor or screen 612 (e.g., a liquid crystal display (LCD), a plasma display, a light emitting diode display (LED), or cathode ray tube (CRT) monitor). The computer system 600 may be connected to a network (e.g., a local area network (LAN), a wide area network (WAN), such as the Internet or any other similar type of network, including wireless networks via a network interface connection 614 to connect, e.g., the client 102 and the server 120 (compare FIGS. 1 to 3). This may also allow a coupling to other computer systems or a storage network or a network attached tape drive. Those skilled in the art will appreciate that many different types of computer systems exist, and the aforementioned input and output means may take other forms. Generally speaking, the computer system 600 may include at least the minimal processing, input and/or output means, necessary to practice embodiments of the invention.

According to one or more aspects, capabilities of a standard XML communication between a client and a server are enhanced reducing overall communication overhead. According to one aspect, a distributed system to improve XML, communication may be provided. The distributed system may comprise a client and a server, in particular connected via a network.

The client may comprise a serialization module for serializing data, in particular from an application of the client into a first communication format. The client may be configured to communicate the data in the first communication format to the server. The server may comprise a communication format parser for de-serializing the data received in the first communication format into a server-internal communication format. The server may be configured for further processing the data in the server-internal communication format.

The serialization module may also be adapted for transforming the data into the server-internal communication format, and the client may be configured for communicating the data in the server-internal communication format to the server.

The client may be adapted for indicating to the server that the client may be capable of sending data in the server-internal communication format. The server may be adapted, responsive to the indication of the client, for indicating its readiness for receiving the data in the server-internal communication format to the client. The server may also be adapted for receiving the data in the server-internal communication format.

The client may be adapted, responsive to the indication of the readiness of the server, for sending the data in the server-internal communication format, and otherwise being adapted for sending the data in the first communication format.

According to another aspect, a method for performing a communication in a distributed system may be provided. The method may comprise providing a distributed system which may comprise a client and a server and a communication link between the client and the server. The method may also comprise communicating data from the client to the server in a first communication format, wherein a serialization module is used for serializing the data, in particular as part of a client application, into the first communication format, in particular before the data may be communicated to the server.

Furthermore, the method may comprise de-serializing the data received in the first communication format into a server-internal communication format using a communication format parser on the server. The data may be processed further in the server-internal communication format.

The client may indicate to the server that the client may be capable of sending data in the server-internal communication format, and be responsive to the indication of the client, that the server may send a readiness indication to receive the data in the server-internal format to the client.

In response to receiving the readiness indication from the server, the client may transform the data into the server-internal communication format using the serialization module. The client may also communicate the data in the server-internal communication format to the server.

In response to not receiving the readiness indication from the server, the client may send the data in the first communication format to the server.

The client and the server may be any computer or computer system. They may be linked or connected by any kind of network.

While the invention has been described with respect to a limited number of embodiments, those skilled in the art, having benefit of this disclosure, will appreciate that other embodiments may be devised, which do not depart from the scope of aspects of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of aspects of the present invention has been presented for purposes of illustration and description, but is not intended to be exhaustive or limited to the aspects of the invention in the form disclosed. Many modifications and variations will be apparent to those of ordinary skills in the art without departing from the scope and spirit of aspects of the invention. The embodiment was chosen and described in order to best explain the principles of aspects of the invention and the practical application, and to enable others of ordinary skills in the art to understand the aspects of the invention for various embodiments with various modifications, as are suited to the particular use contemplated.

What is claimed is:

1. A distributed system comprising:
   one or more memories;
   one or more processors in communication with the one or more memories; and
   program instructions executable by the one or more processors via the one or more memories to perform a method, the method comprising:
      communicating, by the one or more processors, over a network, data from a client to a server, wherein the client comprises a serialization module to serialize data into a first communication format, the serialization module being further adapted to transform the data into a server-internal communication format, wherein the server comprises a communication format parser, the communicating comprising;
      indicating, by the one or more processors, to the server that the client is capable of sending data in the server-internal communication format; and
      based on receiving a readiness indication from the server indicating a readiness of the server to receive the data in the server-internal communication format, utilizing, by the one or more processors, the serialization module to transform the data into the server-internal communication format, and sending the data in the server-internal communication format to the server, wherein upon receipt of the data in the server-internal communication format, the server processes the data in the server-internal communication format without utilizing the communication format parser;
      utilizing, by the one or more processors, the serialization module to serialize subsequent data into the first communication format and sending the subsequent data in the first communication format from the client to the server, wherein upon receipt of the data in the first the communication format, the server utilizes the communication format parser to process the data.

2. The distributed system according to claim 1, wherein the server processing the data in the server-internal communication format without utilizing the communication format parser, comprises by-passing the communication format parser of the server.

3. The distributed system according to claim 1, wherein the server processing the data in the server-internal communication format without utilizing the communication format parser, comprises passing the data through the communication format parser of the server.

4. The distributed system according to claim 1, wherein the first communication format is based on the eXtensible Markup Language.

5. The distributed system according to claim 1, wherein the server comprises a mainframe computer.

6. The distributed system according to claim 5, wherein the mainframe computer comprises a z/OS based server.

7. The distributed system according to claim 1, further comprising receiving by the client server-internal communication format setting data as the indication of the readiness of the server to receive data in the server-internal communication format.

8. The distributed system according to claim 7, wherein the utilizing the serialization module to transform the data into the server-internal communication format using the serialization module is based on the server-internal communication format setting data.

9. A method of performing a communication in a distributed system, the method comprising:
   communicating, by the one or more processors, over a network, data from a client to a server, wherein the client comprises a serialization module to serialize the data into the first communication format, the serialization module being further adapted to transform the data into a server-internal communication format, wherein the server comprises a formal parser, the communicating comprising;
   indicating, by the one or more processors, to the server that the client is capable of sending data in the server-internal communication format; and
   responsive to receiving a readiness indication from the server indicating a readiness of the server to receive the data in the server-internal communication format, utilizing, by the one or more processors, the serialization module to transform the data into the server-internal communication format, and sending the data in the server-internal communication format to the server, wherein upon receipt of the data in the server-internal communication format, the server processes the data in the server-internal communication format without utilizing the communication format parser;

utilizing, by the one or more processors, the serialization module to serialize subsequent data into the first communication format and sending the subsequent data in the first communication format from the client to the server, wherein upon receipt of the data in the first communication format, the server utilizes the communication format parser to process the data.

10. The method according to claim 9, wherein the server processing the data in the server-internal communication format without utilizing the communication format parser, comprises by-passing the communication format parser of the server.

11. The method according to claim 9, wherein the server processing the data in the server-internal communication format without utilizing the communication format parser, comprises passing the data through the communication format parser of the server.

12. The method according to claim 9, wherein the first communication format is based on the eXtensible Markup Language.

13. The method according to claim 9, further comprising receiving by the client server-internal communication format setting data as the indication of the readiness of the server to receive data in the server-internal communication format.

14. The method according to claim 13, wherein the utilizing the serialization module to transform the data into the server-internal communication format using the serialization module is based on the server-internal communication format setting data.

15. A computer program product for performing a communication in a distributed system, the computer program product comprising:

a non-transitory computer readable storage medium readable by a processing circuit and storing instructions for execution by the processing circuit for performing a method comprising:

communicating, by the processing circuit, over a network, data from a client to a server, wherein the client comprises a serialization module to serialize the data into the first communication format, the serialization module being further adapted to transform the data into a server-internal communication format, wherein the server comprises a formal parser, the communicating comprising;

indicating, by the processing circuit, to the server that the client is capable of sending data in the server-internal communication format; and responsive to receiving a readiness indication from the server indicating a readiness of the server to receive the data in the server-internal communication format, utilizing, by the processing circuit, the serialization module to transform the data into the server-internal communication format, and sending the data in the server-internal communication format to the server, wherein upon receipt of the data in the server-internal communication format, the server processes the data in the server-internal communication format without utilizing the communication format parser;

utilizing, by the processing circuit, the serialization module to serialize subsequent data into the first communication format and sending the subsequent data in the first communication format from the client to the server, wherein upon receipt of the data in the first communication format, the server utilizes the communication format parser to process the data.

16. The computer program product according to claim 15, wherein the server processing the data in the server-internal communication format without utilizing the communication format parser, comprises by-passing the communication format parser of the server.

17. The computer program product according to claim 15, wherein the server processing the data in the server-internal communication format without utilizing the communication format parser, comprises passing the data through the communication format parser of the server.

18. The computer program product according to claim 15, wherein the first communication format is based on the eXtensible Markup Language.

19. The computer program product according to claim 15, wherein the method further comprises receiving by the client server-internal communication format setting data as the indication of the readiness of the server to receive data in the server-internal communication format.

20. The computer program product according to claim 15 wherein the utilizing the serialization module to transform the data into the server-internal communication format using the serialization module is based on the server-internal communication format setting data.

* * * * *